April 27, 1937. J. C. F. C. RICHTER ET AL 2,078,810
APPARATUS FOR CONTINUOUS TREATMENT OF WOOD PULP AND THE LIKE WITH CHEMICALS
Filed Feb. 20, 1935
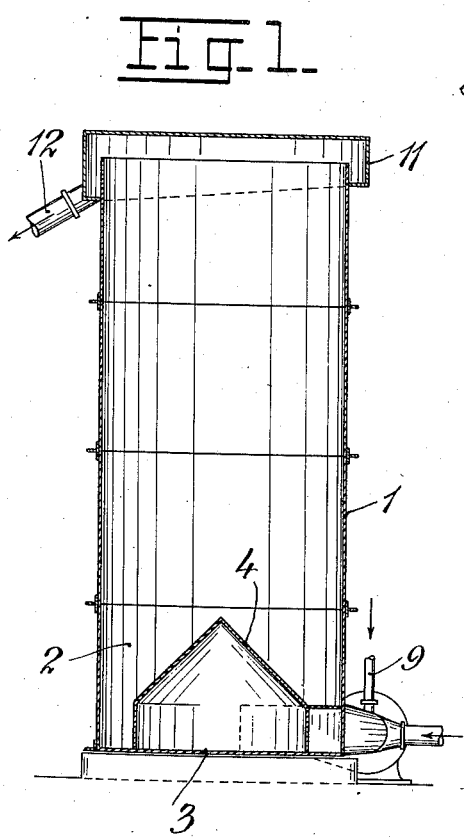
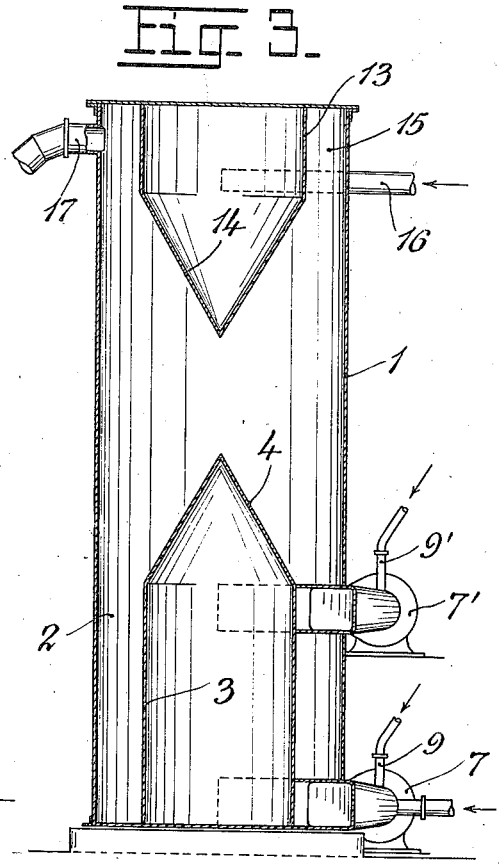
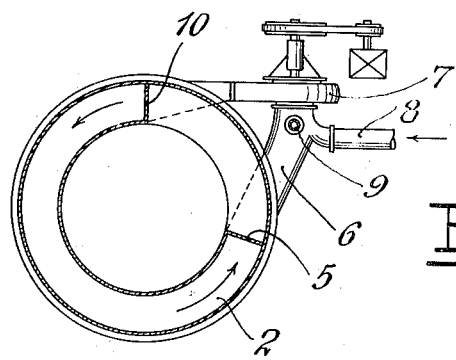

Patented Apr. 27, 1937

2,078,810

UNITED STATES PATENT OFFICE 2,078,810

APPARATUS FOR CONTINUOUS TREATMENT OF WOOD PULP AND THE LIKE WITH CHEMICALS

Johan Cristoffer Fredrik Carl Richter, Oslo, and Karl Wilhelm Rosén, Svelvik, Norway, assignors to Aktiebolaget Kamyr, Oslo, Norway Application February 20, 1935, Serial No. 7,454
In Norway January 12, 1934

5 Claims. (Cl. 8—2)

The present invention relates to a process and an apparatus for continuous chemical treatment, such as chlorine bleaching of wood pulp and the like, the process being particularly adapted for gas bleaching, and the main characteristic feature of the invention consists therein that the pulp to be treated with chlorine or the like, is continuously introduced together with the chlorine into a circulating quantity of pulp, the circulation chamber of which is connected with a rising pipe or vessel through which the chlorine treated pulp moves upwards and is continuously removed at the top after a suitable period of reaction.

The process may suitably be carried out by means of an apparatus comprising a tank or vessel, the bottom of which is formed by an open annular channel, which communicates at two points with the suction and pressure side of a circulation pump, the suction side of which is also connected with a conduit for continuous supply of unbleached or partly bleached pulp and with a pipe for the supply of chlorine gas.

Hereby it is obtained that the amount of pulp and the amount of chlorine gas or other reagent supply is introduced into and mixed with a large circulating amount of pulp which is supplied from the annular channel, so that the effect of small variations in the supply of pulp and chemicals during the continuous process are equalized in the same manner as in ordinary circulation vessels for interrupted or batch treatment. Further it is obtained that continuous chlorine bleaching may be carried out directly with chlorine gas under the same good conditions as with interrupted bleaching, the large circulating amount of pulp in the bottom of the vessel being able without difficulty to absorb the chlorine gas supplied.

Further it must be pointed out that, whereas in previously known systems for continuous chlorine bleaching, gas is supplied through mixers at the top of a vessel having its outlet near the bottom, gas as well as pulp in accordance with the present invention are supplied at the bottom of the tank.

Hereby it is obtained that in case the supply of chlorine gas should for some reason or other amount to more than the pulp is able to absorb at the moment, the amount of pulp above the supply is so high, that possible bubbles of chlorine gas will be absorbed before they reach the top of the tank.

The open annular channel under certain conditions may be made comparatively deep and be fitted with two circulation systems, one being located at the bottom and one near the top of the channel.

In connection with the upper circulation system it is possible to continuously renew the chemical treatment and also it is possible to supply other chemicals.

The overflow at the top of the vessel may take place along the whole circumference, or a tangential jet of water may be introduced near the top in order to increase the rotation of the pulp, in which case it is possible to use only a single overflow opening and still obtain an even, continuous outlet.

On the drawing two forms of apparatus for carrying out the process are illustrated diagrammatically, Figures 1 and 2 showing vertical and horizontal section through one form of apparatus, whereas Fig. 3 is a vertical section through another form.

The apparatus illustrated on Figures 1 and 2 comprise a tank 1, the bottom part of which is formed by an upwardly open annular channel 2. The interior wall of this channel is formed by a cylindric member 3 having a conical top 4. As it appears from Fig. 2 the channel at one point 5 is connected with the suction conduit 6 for a circulation pump 7, the suction side of which is also connected with a conduit 8 for continuous supply of pulp to be treated and with a supply pipe 9 for chemicals, such as chlorine gas. The pressure side of the pump is again connected to the channel 2 at 10.

Suitably the channels from the suction and pressure side of the channel 2 go approximately tangential in order to provide a good circulation movement in the channel.

Near the top the tank is provided with an exterior annular channel 11, having an outlet tube 12 to take up pulp which has been treated.

In the apparatus illustrated on Fig. 3 the cylindrical member 3 with the conical top 4 is made considerably higher, making the channel 2 deeper. Besides the circulation system illustrated on Fig. 1 and comprising the pump 7 at the bottom of channel 2, there is located higher up in the channel a further circulation system of the same type, having a pump 7' and a supply conduit 9' for further chemicals. In the upper part of the tank there is located a cylindrical member 13 with a conical bottom part 14, whereby the upper part of the tank is given the form of a channel 15 similar to the channel 2. In this channel 15 there is placed a tangential jet tube 16 for water or the like, by means of which the circulation is supported, whereas the pulp is at the same time suitably diluted.

In this arrangement it is not necessary to have overflow over the whole of the circumference of the tank, it being possible to obtain an even continuous outlet through a single overflow tube as illustrated at 17.

We claim:

1. An apparatus for treating material with chemicals, comprising a tank, the bottom of which is formed by an upwardly open annular channel connected at two points with the suction and pressure side respectively of a circulation pump, the suction side whereof is also connected with a conduit for continuous supply of material to be treated as well as with a supply pipe for chemicals, such as chlorine gas or the like.

2. An apparatus for treating material with chemicals, comprising a tank, the bottom of which is formed by an upwardly open annular channel connected by means of two tangential channels at two points with the suction and pressure side respectively of a circulation pump, the suction side whereof is also connected with a conduit for continuous supply of material to be treated as well as with a supply pipe for chemicals, such as chlorine gas or the like.

3. An apparatus for treating material with chemicals, comprising a tank, the bottom of which is provided with an interior cylinder coaxial with the tank wall and having a cone-shaped top, so as to form an upwardly open annular channel, said channel being connected at two points with the suction and pressure side respectively of a circulation pump, the suction side whereof is also connected with a conduit for continuous supply of material to be treated as well as with a supply pipe for chemicals, such as chlorine gas or the like.

4. An apparatus for treating material with chemicals, comprising a tank, the bottom of which is provided with an interior cylinder coaxial with the tank wall and having a cone-shaped top, so as to form an upwardly open annular channel, said channel being connected at two points with the suction and pressure side respectively of a circulation pump, the suction side whereof is also connected with a conduit for continuous supply of material to be treated as well as with a supply pipe for chemicals, such as chlorine gas or the like, the said tank being provided at its top with a cover having a downwardly extending interior cylinder having a cone-shaped bottom, so as to form a second annular channel.

5. An apparatus for treating material with chemicals, comprising a tank, the bottom of which is provided with an interior cylinder coaxial with the tank wall and having a cone-shaped top, so as to form an upwardly open annular channel, said channel being connected at two points with the suction and pressure side respectively of a circulation pump, the suction side whereof is also connected with a conduit for continuous supply of material to be treated as well as with a supply pipe for chemicals, such as chlorine gas or the like, the said tank being provided at its top with a cover having a downwardly extending interior cylinder having a cone-shaped bottom, so as to form a second annular channel, said second annular channel being provided with a tangential jet tube through which water is adapted to be injected for maintaining circulation and diluting the pulp.

JOHAN CRISTOFFER FREDRIK
     CARL RICHTER.
KARL WILHELM ROSÉN.